Nov. 1, 1966 L. F. BLACHOWICZ ETAL 3,283,320
ANALOG-TO-DIGITAL TRANSLATOR
Filed Aug. 15, 1963
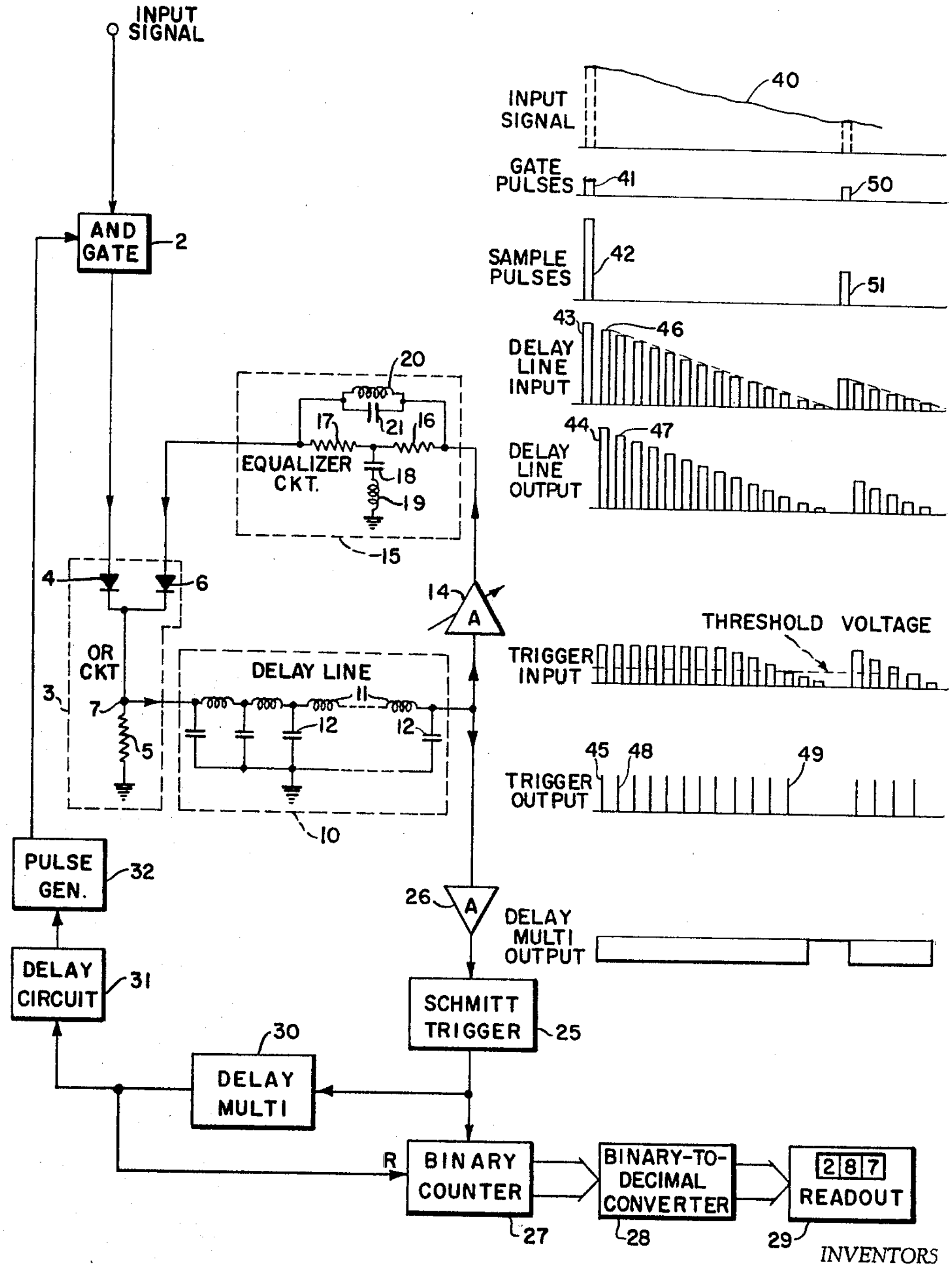
INVENTORS
Leon F. Blachowicz &
Harry D. Shearer
BY Charles J. Eldenkin
ATTORNEYS

United States Patent Office 3,283,320

Patented Nov. 1, 1966

3,283,320

ANALOG-TO-DIGITAL TRANSLATOR

Leon F. Blachowicz and Harry D. Shearer, St. Petersburg, Fla., assignors to Electronic Communications, Inc., St. Petersburg, Fla., a corporation of New Jersey Filed Aug. 15, 1963, Ser. No. 302,333
8 Claims. (Cl. 340—347)

This invention relates to analog-to-digital translators and more particularly to translators capable of providing digital indications in accordance with the amplitude of an incoming signal.

In designing computers, it is often desirable to combine analog and digital techniques which brings about a need for analog-to-digital translators which can convert the instantaneous incoming signal amplitude into a numerical or digital indication. Analog-to-digital translators also find considerable use in meter or telemetering systems where it is desirable to have a numerical display or digital signal for transmission purposes.

The prior analog-to-digital translators appear to fall into two general categories. In one type of system, a time function signal is derived which is proportional to the incoming signal amplitude so that a suitable counter can count pulses during a certain time interval and thereby derive a digital indication. The time function signal is usually attained by either noting the time required for a potential equal to the incoming signal amplitude to build up across a capacitor, or by noting the time required to diminish the incoming signal amplitude to zero by means of a controlled feedback circuit.

In the other type of known system the incoming signal amplitude is compared with reference potentials to derive the digital indication. This can be accomplished by using a staircase signal and counting the number of incremental increases required to build up a potential equal to the amplitude of the incoming signal. As an alternative, potentials of certain selected amplitude values can be subtracted from the incoming signal so that a digital indication can be derived by noting which potential values can successfully be subtracted.

The prior systems are of limited accuracy or else are complex and prohibitively expensive. Thus, it is an object of this invention to provide an accurate, yet relatively inexpensive, analog-to-digital translator.

It is another object to provide an analog-to-digital translator which does not derive a time function signal or rely upon reference potentials in order to achieve a digital indication.

The analog-to-digital translator in accordance with this invention includes a closed loop circuit into which a sample pulse can be introduced having an amplitude proportional to the instantaneous amplitude of the incoming signal. The sample pulse is then continuously recycled in the closed loop circuit. The gain of the loop is adjusted so that the amplitude of the sample pulse is modified slightly during each cycle. A counter, connected to the closed loop circuit, counts the number of times that the sample pulse can be recycled before the amplitude thereof reaches a predetermined value. This count is then proportional to the initial amplitude of the incoming sample pulse.

More specifically, the system can be arranged so that a sample pulse passes through a time delay circuit and is then applied to a voltage threshold circuit. If the amplitude of the pulse is greater than the threshold voltage, a count is registered by a suitable binary counter. The sample pulse, after passing through the time delay circuit, passes through an amplifier and then returns to the input of the delay circuit. The gain of the amplifier is adjusted so that the amplitude of the sample pulse is slightly less during the second pass through the delay circuit. If the amplitude of the sample pulse is still greater than the threshold voltage after the second pass, a second count is registered and the pulse is again recycled. Operation continues in this fashion until the amplitude of the sample pulse falls below the threshold voltage. The registered count is then proportional to the initial amplitude of the sample pulse.

The foregoing stated objects, as well as other objects, can more easily be understood by referring to the following specification and drawing. The drawing forms a portion of the specification, and includes a schematic diagram of one embodiment in accordance with this invention as well as certain wave forms illustrating the signal found at various points in the circuit.

The incoming signal is applied to the input of an AND gate 2. When a pulse is applied to the gate input of the AND gate, the output signal is the same as the incoming signal for the duration of the pulse. Thus, when a pulse is applied to the gate input, the AND gate permits a selected portion of the incoming signal to pass through, thus providing sample pulses, each sample pulse having an amplitude equal to the instantaneous amplitude of the incoming signal.

The output of AND gate 2 is connected to one input of an OR circuit 3. OR circuit 3 includes a pair of diodes 4 and 6 each having the cathode thereof connected to a common junction 7 with a resistor 5 connected between the common junction and ground. The OR circuit provides electrical isolation between the inputs at the anodes of diodes 4 and 6, and permits the signal applied at either of the inputs to appear at the output of the OR circuit at junction 7.

The output of OR circuit 3 is connected to the input of a delay circuit 10 shown as a lumped parameter delay line. The delay circuit can be of any conventional type capable of delaying an applied input pulse with relatively little attenuation or distortion. The delay line shown is a ladder network including a number of inductors 11 connected in series with capacitors 12 connected between the ends of the inductors and ground. The number or size of components in the delay line can easily be calculated from information found in handbooks to achieve the desired time delay and minimum desired distortion and attenuation. Pulses at the output of the delay line are essentially the same as pulses at the input, but appear slightly later in time.

Delay circuit 10 and OR circuit 3 are interconnected with an amplifier 14 and an equalizer circuit 15 to form a closed loop circuit for continuously recycling a sample pulse introduced through OR circuit 3. Even though the delay line is carefully designed, it will still have inherent losses and a finite band width, and hence some distortion will appear in the pulse emerging from the delay line. The distortion may not be noticeable after the first pass of the sample pulse through the delay line, but effects of the distortion are cumulative and will become more apparent on subsequent passes. Equalizing circuit 15 is designed to compensate for these distortions and restore the pulse to the original shape. A bridged T network, as shown in the drawing, has been found to provide adequate compensation for a lumped parameter delay line. The equalizing network includes resistors 16 and 17 connected in series. A capacitor 18 and inductor 19 are connected in series from the junction between the resistors to ground and a capacitor 21 and an inductor 20 are connected in parallel across the resistors. The values of the components in the equalizer circuit can easily be calculated from information found in various handbooks and are selected to provide the desired compensation to prevent deterioration of the sample pulse configuration.

The output of delay circuit 10 is connected to the input of equalizer circuit 15 via amplifier 14, and the output of the equalizer circuit is connected to the input of delay circuit 10 via diode 6 of OR circuit 3, to thereby complete the closed loop circuit. A sample pulse which is introduced into the closed loop circuit via diode 4 is continuously recycled, passing through delay circuit 10, amplifier 14, equalizer circuit 15, and diode 6 of OR circuit 3, in succession. To obtain a linear translation characteristic, amplifier 14 is designed such that it possesses a logarithmic gain characteristic. This is necessary since each pulse at the output of the delay line loop must differ from the preceding one by a constant increment rather than by a constant percentage. Such an amplifier may be readily constructed using information readily available in the literature. If a logarithmic digital presentation of the input signal amplitude is desired, amplifier 14 will have a linear gain characteristic.

The output of delay circuit 10 is also connected to the input of a Schmitt trigger circuit 25 via a wide-band pulse amplifier 26. The Schmitt trigger circuit is designed to provide an output pulse when an input pulse is applied having an amplitude exceeding the threshold voltage of the trigger circuit. Trigger circuit 25 is preferably designed having a threshold voltage slightly above zero. The effective threshold voltage, with respect to the pulses appearing at the output of the delay circuit, can be made as low as desired by increasing the gain of amplifier 26. Amplifier 26 preferably includes a limiter circuit so that large pulses appearing at the amplifier input will not overload the input circuit of the Schmitt trigger.

The output of trigger circuit 25 is connected to an electronic binary counter 27 which counts the pulses provided by the trigger circuit. The binary counter is connected to a binary-to-decimal converter circuit 28 which in turn is connected to a read-out device which displays a visible indication in accordance with the number of pulses counted. The binary counter, the binary-to-decimal converter, and the read-out device are merely illustrative and may be replaced by virtually any type of electronic counter and associated output circuits.

The output of Schmitt trigger circuit 25 is also connected to a delay monostable multivibrator circuit 30. This circuit is normally in the stable state, but is switched to the astable state to provide a negative output potential when an input pulse is applied. The time constant of the monostable circuit must be greater than the time delay of delay circuit 10 so that the circuit will remain in the astable state as long as a sample pulse is being recycled to provide pulses at the output of trigger circuit 25. The output of delay multivibrator circuit 30 is connected to the reset input of binary counter 27. The binary counter is of the type which is reset by a positive going potential, and hence the binary counter is reset to a zero count when the monostable circuit 30 switches from the astable state back to the stable state. The length of time that the binary counter retains the complete count can be increased by increasing the time constant of monostable circuit 30.

The output from monostable circuit 30 is also connected to a pulse generator circuit 32 via a delay circuit 31. The positive going portion of the output potential from the multivibrator circuit 30 emerges from the delay circuit 31 somewhat later in time and triggers pulse generator circuit 32 to provide a pulse to the gate input of AND gate 2. It should be noted that a sample pulse continues to recycle in the closed loop circuit after the amplitude thereof has fallen below the threshold voltage of the trigger circuit. The total time delay provided by delay multivibrator 30 and delay circuit 31 must be sufficiently great to permit dissipation of the sample pulse to a nominal amplitude value before a new sample pulse is introduced. The width of the gate pulse provided by pulse generator 32, i.e., the time duration of the gate pulse, must be less than the time delay provided by delay circuit 10 so that the sample pulse will not interfere with itself while being recycled in the closed loop circuit.

The operation of the analog-to-digital translator can best be explained by referring to the various waveforms shown in the drawing. Assume that the incoming signal 40 is as shown. When a gate pulse 41 is applied to the gate input of AND gate 2, a sample pulse 42 will emerge from the gate circuit. The amplitude of sample pulse 42 is identical to the instantaneous amplitude of incoming signal 40. Sample pulse 42 passes through diode 4 of OR circuit 3 and appears as pulse 43 at the input of delay circuit 10. Shortly thereafter, the sample pulse passes through delay circuit 10 and appears as pulse 44 at the output of the delay circuit. The amplitude of pulse 44 is greater than the effective threshold voltage of trigger circuit 25, and therefore the trigger circuit produces a pulse 45 which is counted by binary counter 27. Pulse 44 then passes through amplifier 14, equalizer circuit 15, and diode 6 of OR circuit 3, and appears at the input of delay circuit 10 as pulse 46. Pulse 46 has an amplitude slightly less than pulse 43 because of the slight attenuation in the closed loop circuit. Shortly thereafter, pulse 46 passes through delay circuit 10 and emerges as pulse 47 which still has an amplitude greater than the effective threshold voltage of the trigger circuit, and therefore the trigger circuit provides pulse 48 which is counted.

The sample pulse continues to recycle in the closed loop circuit, diminishing in amplitude slightly during each cycle. Eventually, the pulse emerging from delay circuit 10 will have an amplitude less than the threshold voltage of the trigger circuit, and thus the trigger circuit will provide no further pulses to binary counter 27. The number of pulses which have been counted by binary counter 27 is proportional to the initial amplitude of the sample pulse, and hence the binary counter provides a digital indication of the initial sample pulse amplitude.

The first pulse 45 provided by trigger circuit 25 places delay multivibrator circuit 30 in the astable state. The circuit remains in the astable state until the last pulse 49 of the group appears at the output of trigger circuit 25 and some time thereafter returns to the stable state, thus resetting the binary counter 27 to zero.

When the amplitude of the pulse being recycled in the closed loop circuit diminishes to an insignificant value, a second gate pulse 50 is applied to the gate input of AND gate 2. This produces a sample pulse 51 which is introduced into the closed loop circuit via OR circuit 3 and is recycled therein in the same fashion. The amplitude of the sample pulse 51 is less than the amplitude of sample pulse 42 and therefore sample pulse 51 will be reduced to the effective threshold voltage after fewer cycles in the closed loop circuit. Thus, the number of pulses provided by trigger circuit 25 and counted by binary counter 27 are fewer in number.

The analog-to-digital translator circuit can easily be calibrated by applying an input signal of a known amplitude and by then adjusting the gain of variable gain amplifier 14 until the proper digital indication appears at read-out unit 29. Adjustment of variable gain amplifier 14 adjusts the closed loop circuit attenuation so that the recycling sample pulse diminishes in the desired fashion.

While only one embodiment of the present invention has been described in detail, it should be obvious that there are numerous variations within the scope of this invention. The invention is more particularly defined in the appended claims.

What is claimed is:

1. A translator circuit for providing a digital indication of the amplitude of an incoming pulse, comprising:

a closed loop circuit connected to receive the incoming pulse and continuously and unidirectionally recycle the same, said circuit being operative to modify the amplitude of the pulse in the same manner once during each cycle thereof;

means connected to said circuit to count the number of cycles required for the pulse amplitude to reach a predetermined level to thereby provide a digital indication of the incoming pulse amplitude.

2. A translator circuit for providing a digital indication of the amplitude of an incoming pulse, comprising:

a closed loop circuit including a time-delay circuit and connected to receive and continuously recycle the incoming pulse, said closed loop circuit being operative to modify the amplitude of the pulse in the same manner once during each cycle thereof, a logic circuit connected so that the input pulse can pass into said delay circuit, and an amplifier circuit connected to pass pulses from the output of said time-delay circuit to the input of said time-delay circuit via said logic circuit; and means connected to said closed-loop circuit to count the number of cycles required for the pulse amplitude to reach a predetermined level to thereby provide a digital indication of the incoming pulse amplitude.

3. A translator circuit in accordance with claim 2 wherein the gain of said amplifier is adjusted so that the amplitude of the pulse returning to the input of said time delay circuit has an amplitude slightly less than that of the previous pulse which has emerged from said time delay circuit.

4. A translator circuit in accordance with claim 2 further including an equalizer circuit connected in said closed loop circuit to compensate for distortion of the sample pulse as caused by other components in the closed loop circuit.

5. A translator circuit for providing a digital indication of the amplitude of an incoming pulse, comprising:

a closed loop circuit connected to receive the incoming pulse and continuously unidirectionally recycle the same, said circuit being operative to attenuate the incoming pulse slightly during each cycle thereof;

means connected to said circuit to count the number of cycles required for the pulse amplitude to diminish to a predetermined level to thereby provide a digital indication of the incoming pulse amplitude.

6. A translator in accordance with claim 5 wherein said means includes a threshold circuit connected to provide an output indication once per cycle provided the recycling pulse has an amplitude exceeding the threshold voltage of said threshold circuit, and an electronic counter connected to count the number of pulses provided by said threshold circuit.

7. A translator circuit for providing a digital indication in accordance with the amplitude of an incoming signal, comprising:

an electronic gate circuit connected to receive the incoming signal and operative to derive a sample pulse therefrom having a magnitude proportional to the instantaneous incoming signal amplitude;

a closed loop circuit;

circuit means connected to introduce said sample pulse into said closed loop circuit;

said closed loop circuit being operative to continuously and unidirectionally recycle said sample pulse and to attenuate the same slightly during each cycle;

counting circuit means connected to said closed loop circuit and operative to count the number of cycles required to reduce the sample pulse amplitude to a predetermined level to thereby derive a digital indication representative of initial sample pulse amplitude.

8. A translator circuit in accordance with claim 7 further comprising pulse generating circuit means connected between said counting circuit means and said electronic gate circuit to provide a gate pulse to said gate circuit to thereby derive a sample pulse after a previous sample pulse being recycled in said closed loop circuit has diminished to a nominal amplitude.

References Cited by the Examiner

UNITED STATES PATENTS 3,056,049 9/1962 Baird ------------- 307—88.5

MAYNARD R. WILBUR, *Primary Examiner.*

MALCOLM A. MORRISON, *Examiner.*

K. R. STEVENS, *Assistant Examiner.*